United States Patent [19]

Hirota

[11] 4,342,053
[45] Jul. 27, 1982

[54] VIDEO SIGNAL, SPEED-CHANGE REPRODUCING SYSTEM

[75] Inventor: Akira Hirota, Chigasaki, Japan

[73] Assignee: Victor Company of Japan, Ltd., Yokohama, Japan

[21] Appl. No.: 58,818

[22] Filed: Jul. 19, 1979

Related U.S. Application Data

[63] Continuation-in-part of Ser. No. 892,147, Mar. 31, 1978, abandoned.

[30] Foreign Application Priority Data

Apr. 1, 1977 [JP] Japan .................. 52-37081

[51] Int. Cl.³ .................. H04N 5/78; G11B 15/52
[52] U.S. Cl. .................. 360/10; 360/64; 360/73; 360/75; 360/21; 360/70
[58] Field of Search .................. 360/10, 33, 64, 73, 360/75, 21, 18, 37, 70

[56] References Cited

U.S. PATENT DOCUMENTS

| | | | |
|---|---|---|---|
| 3,294,902 | 12/1966 | Maxe | 360/10 |
| 3,557,320 | 1/1971 | Hopf | 360/10 |
| 3,588,334 | 6/1971 | Comas | 360/10 |
| 3,821,787 | 6/1974 | Kihara | 360/33 |
| 3,925,816 | 12/1975 | Kihara | 360/33 |
| 3,943,562 | 3/1976 | Opelt | 360/10 |
| 3,959,818 | 5/1976 | Iketaki | 360/14 |
| 3,968,518 | 7/1976 | Kihara | 360/10 |

*Primary Examiner*—Vincent P. Canney
*Assistant Examiner*—Alan Faber
*Attorney, Agent, or Firm*—Louis Bernat

[57] ABSTRACT

A video signal, speed-change reproducing system has a tape on which a video signal has been recorded. The tracks are disposed contiguously and obliquely relative to the tape longitudinal direction. The successive tracks are individually recorded by a plurality of rotating heads having gaps of mutually different azimth angles. The tape travels at a selected speed V which is represented by the equation $$V = V_0 \left( \frac{n-1}{n} \right),$$

wherein Vo is the tape speed for normal reproduction (and recording), and n is a positive or negative integer. A pair of rotating reproducing heads have reproducing gaps which are also of the same mutually different azimuth angles that are used for recording. The reproducing heads are adapted to successively scan the tracks of the tape to reproduce the recorded video signal. The centers of the track width of the rotating heads are different in height positions with respect to the rotational planes in which the heads travel. The rotational phase of the reproducing heads are controlled such that each time instant when the level of the reproduce signal becomes a minimum value is within or in the vicinity of a vertical blanking period, and the minimum level of the reproduced signal does not become zero.

5 Claims, 21 Drawing Figures

VIDEO SIGNAL, SPEED-CHANGE REPRODUCING SYSTEM

BACKGROUND OF THE INVENTION

The present application is a Continuation-In-Part Application of U.S. patent application Ser. No. 892,147 filed Mar. 31, 1978, now abandoned.

The present invention relates generally to video signal, speed-change reproducing systems, and more particularly to a video signal, speed-change reproducing system for reproducing a video signal recorded on mutually adjacent tracks alternately with two heads having mutually different azimuth angles and mutually different track width. The video signal is reproduced at a selected predetermined speed which is different from the speed used for the recording, such that noises are reduced in the signal portions of which reproduced signal level is minimum.

The prior art employs a system wherein a video signal is recorded on a magnetic tape on parallel tracks formed obliquely to the longitudinal direction of the magnetic tape. This tape travels at a tape speed which is different from that used at the time of recording or stops thereby to carry out speed-change reproduction such as quick-motion reproduction, slow-motion reproduction, or still picture reproduction. In this system, the tape speed at the time of reproduction is different from that at the time of recording; therefore the path (track) which the head traces on the tape during reproduction is different from the path (track) traced by the head during recording.

On the one hand, a conventional video signal recording and reproducing system, ordinarily, forms tracks on a recording medium in a manner which leaves an unrecorded zone or band called a guard band between neighboring tracks in order to prevent the generation of beats caused by the reproduced signals of neighboring tracks due to tracking deviation of the head at the time of reproduction. When a tape recorded in this manner is played back by speed-change reproduction as described above, the head traces over the track and the unrecorded band. When the head traces over the unrecorded band, the reproduced signal is remarkably lowered in level or disappears. For this reason, a noise is generated in the reproduced picture. Furthermore, in the above mentioned system, since unrecorded bands are provided between tracks, the utilization efficiency of the tape has been poor.

In addition, there has been a system wherein the angle of inclination of the tape is varied relative to the head rotating plane, in accordance with the tape speed. The heads will then trace accurately over the track at the time of speed-change reproduction. However, this system has been accompanied by problems relating to the complexity of the mechanism for varying the inclination angle of the tape. The complexity gives rise to high cost apparatus, and creates a difficulty of accurate tracking in actual practice.

On the other hand, the assignee of the present invention has previously developed a system wherein tracks are formed on a tape without gaps to guard bands between neighboring tracks. Moreover, a color video signal can be recorded and reproduced on such a tape without the occurrence of an interference beat disturbance. This system is described in U.S. patent application Ser. No. 731,935 entitled "Color video signal recording and/or reproducing system" filed Oct. 13, 1976, and assigned to the assignee of this application and now U.S. Pat. No. 4,178,606. In this previously developed system, a pair of azimuth heads have gaps which are inclined with a certain azimuth angle, in mutually opposite directions with respect to a direction perpendicular to the longitudinal direction which is of the track. Neighboring tracks are formed in contiguous contact side-by-side without a gap or guard band therebetween. The phase of the chrominance signal is shifted by 90 degrees for every horizontal scanning period. The direction of this phase shifting is reversed from one track to the next neighboring track. In accordance with this system, the tape utilization efficiency is high since the tracks are in close contact with each other. Moreover, there is no beat disturbance.

In this developed system, if the tape speed is merely varied at will in order to carry out speed-change reproduction, a noise component due to a reduction of the reproduced signal level accompanying tracking deviation will appear at irregular positions on the reproduced picture screen. For this reason, the noise part in the picture moves, and the S/N ratio of the entire picture becomes poor. Consequently, a speed-change reproduced picture cannot be obtained in good picture quality.

In order to remove the above described disadvantages, a new system is proposed in U.S. Patent Application Ser. No. 891,409 now abandoned entitled "Video Signal, Speed-Change Reproducing System" filed Mar. 29, 1978 now refiled in a Continuation-In-Part application Ser. No. 58,537 of which assignee is the same as that of the present application. According to this proposed system, as similarly according to the present invention, noise parts due to decreasing of the reproduced signal level does not fluctuate and appears at a constant position in the reproduced picture screen (preferably at the vertical blanking position), whereby the above described disadvantages are removed.

However, according to this proposed system, the level of the reproduced signal at a level minimum position assumes nearly zero, whereby the signal is scarcely reproduced. Accordingly, the signal to noise ratio of the parts of the reproduced signal of which level is minimum is greately deteriorated. In a case where the minimum reproduced signal level portion is set at the vertical blanking position, the vertical synchronizing signal is not reproduced positively in a good signal to noise ratio, whereby there arises a problem wherein the vertical synchronization is scarcely attained.

SUMMARY OF THE INVENTION

Accordingly, it is a general object of the present invention to provide a novel and useful system for speed-change reproduction of video signal in which the above described difficulties have been overcome.

Another object of the invention is to provide a system for speed-change reproduction of video signals in which any noise bar due to a lowering of the reproduced signal on the reproduced picture is always at a constant and inconspicuous position on the picture screen, and, only a small amount of noise is generated. In this system, the tape utilization efficiency is also high. By selecting the tape speed at a specific value at the time of reproduction, the noise bar is always produced at a certain position on the picture screen. Furthermore, by selecting the relative scanning phases of the heads on the tape to have a specific relationship to the tape, the noise bar can be caused to be at a constant and inconspicuous or invisible position on the picture screen. Furthermore, this system employs heads having mutually different azimuth angles and different track widths. Signal reproduction can be carried out to a degree such that the reproduced signal level does not become zero. The vertical synchronizing signal is reproduced even when the reproduced signal level becomes a minimum. In accordance with the system of the invention, the vertical synchronization can be positively obtained even when a noise bar is produced due to the minimum reproduced signal level, within a vertical blanking period.

Further objects and features of the invention will be apparent from the following detailed description when read in conjunction with the accompanying drawings.

DETAILED DESCRIPTION

Figure 1:
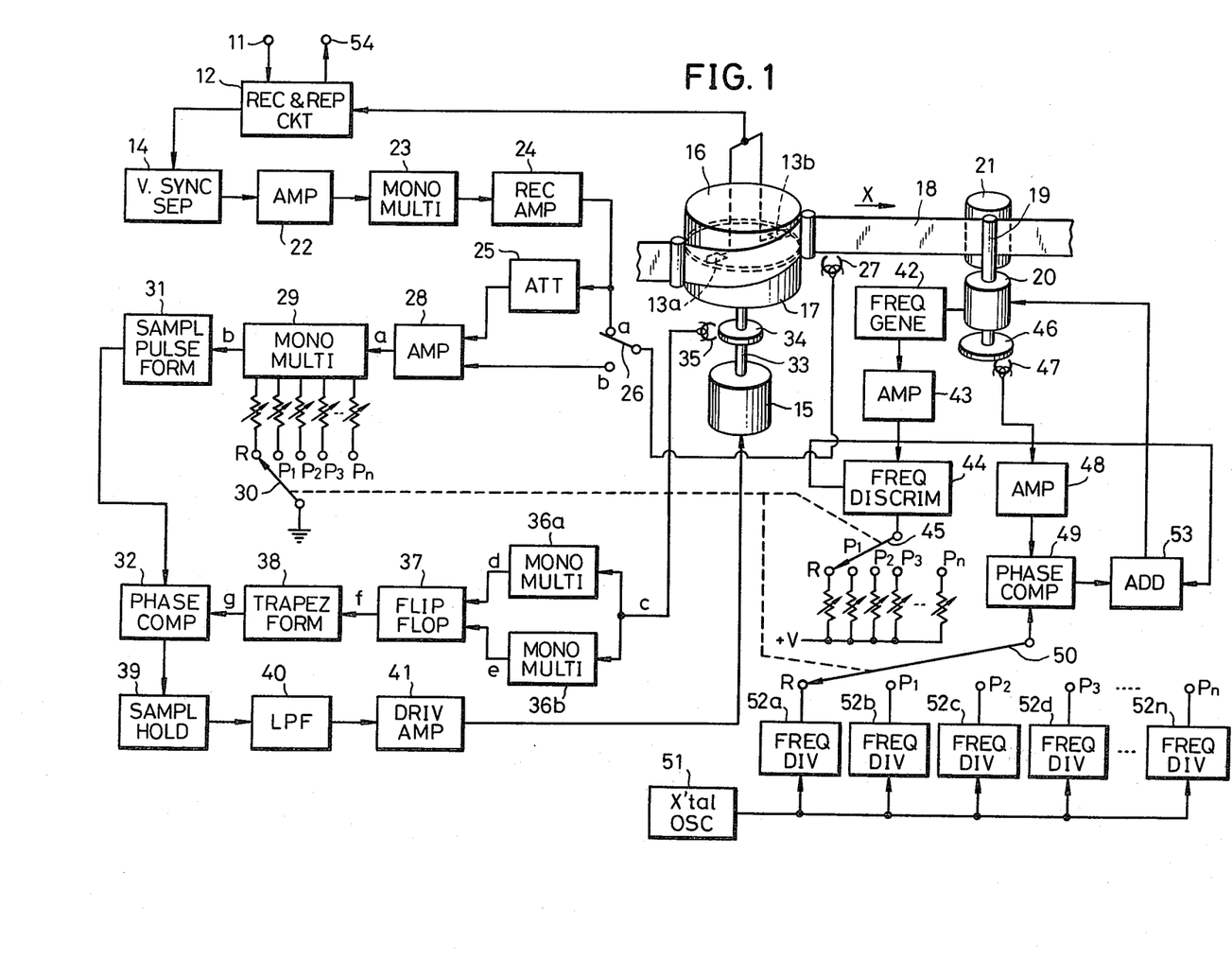
FIG. 1 is a block diagram of one embodiment of the system for speed-change reproduction of video signals according to the invention.

In FIG. 1 a video signal to be recorded is introduced into the system shown through an input terminal 1, is passed through a recording and reproducing circuit 12, and is supplied to a pair of recording and reproducing video heads 13a and 13b and to a vertical synchronizing signal separation circuit 14. The video heads 13a and 13b have mutually opposite azimuths and mutually different track widths as described hereinafter and are mounted on diametrically opposite sides of a rotary drum 16, which is rotated at a rotational speed of 30 rps. by a head motor 15. A magnetic tape 18 is wrapped obliquely around the rotary drum 16 and a stationary drum 17. The tape is driven by a capstan 19 to travel in the arrow direction X by a capstan 19 driven by a motor 20 and a pinch roller 21. A video signal is recorded by the video heads 13a and 13b which alternately trace along tracks on the tape 18, successively one field per track. The tracks are resultingly positioned contiguously to each other and obliquely relative to the longitudinal direction of the tape.

On the other hand, a vertical synchronizing signal of 60 Hz which has been separated from the video signal in the vertical synchronizing signal separation circuit 14 is passed through an amplifier 22 and supplied to a monostable multivibrator 23. There its frequency is halved to 30 Hz. The resulting output signal is passed through a recording amplifier 24 and supplied to an attenuator 25. At the same time, the output signal is transmitted by way of a switch 26, with its moving contact on contact point a, to a control head 27, by which the signal is recorded as a control signal on the lower edge of the tape 18.

Figure 2:
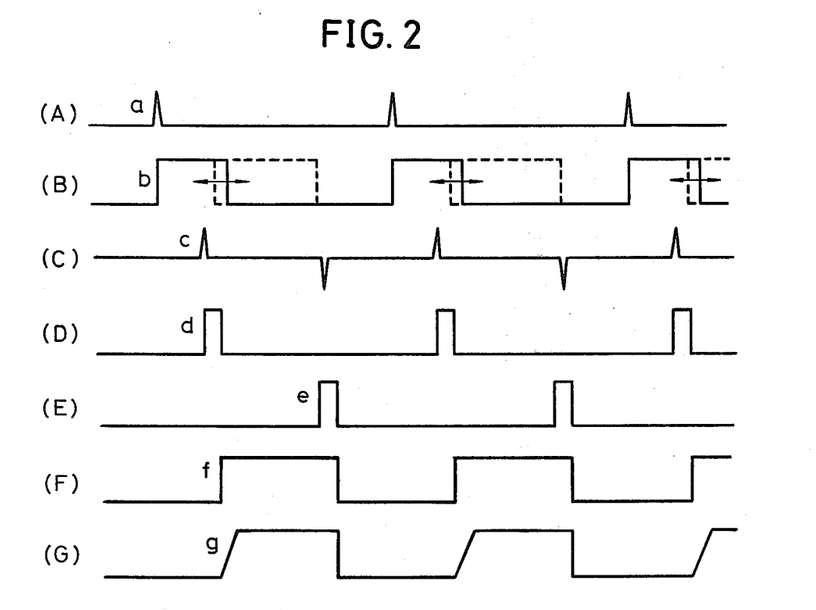
FIGS. 2(A) through 2(G) are diagrams respectively indicating the waveforms of signals at various parts of the system shown in FIG. 1.

The signal which has passed through the attenuator 25 is supplied through an amplifier 28 to a monostable multivibrator 29. The switching and setting of the time constant of this monostable multivibrator 29 is carried out by the change-over of a switch 30, as described hereinafter. Resistors of different resistance values are connected between the monostable multivibrator 29 and the contents of the switch 30. This monostable multivibrator 29 produces as output a pulse signal output b as indicated in FIG. 2(B). The pulses rise in response to a signal a as indicated in FIG. 2(A) from the amplifier 28 and falls with a time constant which is selected by the switch 30. This switch 30 is connected to the contact point R at the time of recording and at the time of normal reproduction. The above mentioned output pulse signal b is formed into a sampling pulse signal by a sampling pulse forming circuit 31 and is thereafter supplied to a phase comparator (sampling circuit) 32.

The rotary drum 16 is coaxially mounted on a vertical rotating shaft 33, which is driven by the motor 15 and rotates together with the rotary drum 16. A pair of magnets of opposite polarity are mounted on a rotating disc 34 fixed coaxially to the rotating shaft 33. Together with rotation of the rotary drum 16, pulses c of positive polarity and negative polarity as indicated in FIG. 2(C) are picked up by a head 35 and are supplied to and trigger monostable multivibrators 36a and 36b. The outputs d and e of the monostable multivibrators 36a and 36b, having waveforms as indicated in FIGS. 2(D) and 2(E) are supplied to a flip-flop circuit 37. The resulting output f of the flip-flop circuit 37 is the waveform indicated in FIG. 2(F) which is supplied to a trapezoidal wave forming circuit 38 to produce a tapezoidal wave g as indicated in FIG. 2(G), which is then supplied to the phase comparator 32.

In the phase comparator 32, the sampling pulses from the sampling pulse forming circuit 31 samples the inclined part of the trapezoidal wave. The resulting output signal of the phase comparator 32 is held by a sampling-hold circuit 39. The trapezoidal wave is then supplied through a low-pass filter 40 for removing high frequency components and integrating to a driving amplifier 41 and then to the motor 15 thereby controlling the rotation thereof. The rotational phase of the motor 15 is so controlled to select the sampling position on the trapezoidal wave in the phase comparator 32. For example, sampling may be in the middle position of the inclined part of the trapezoidal wave.

In the above described embodiment, the rotation of the motor 15 is controlled by means of the phase comparator 32. However, the rotational phase of the motor 15 may be controlled by driving the motor 15 at a constant speed, while the phase comparator 32 controls an electromagnetic braking of the motor 15. Otherwise, the rotation of the capstan 19 may also be controlled by the output of the phase comparator 32 so that the travelling phase of the tape 18 is controlled thereby to control the scanning phases of the heads 13a and 13b, with respect to the tracks on the tape 18.

Together with the rotation of the capstan motor 20, a frequency generator 42 coupled thereto produces an output signal. This output signal is passed through an amplifier 43. The signal thus amplified is supplied to a frequency discriminator 44, where it is frequency discriminated. To the frequency discriminator 44 is connected a selection switch 45 whose moving contact can be connected to any of a plurality of contact terminals R and P1 through Pn respectively connected to different resistors. This switch 45 is selectively operated so that a voltage corresponding to a frequency to be discriminated is applied to the frequency discriminator 44. In the recording and normal reproducing modes, the moving contact of the switch 45 is connected to the terminal R.

Furthermore, a rotating disc 46 is coaxially fixed to the rotor shaft of the capstan motor 20 and is provided with a pair of magnets. A detection head 47 operates cooperatively with the magnets to output rotation pulses as the capstan motor 20 rotates. These rotation pulses are amplified in an amplifier 48 and supplied to a phase comparator 49. On the other hand, a crystal oscillator 51 is provided to supply a signal of a stable specific frequency to each of a plurality of frequency dividers 52a through 52n. These frequency dividers 52a through 52n, which are hereinafter described more fully, respectively have different specific frequency-dividing ratios corresponding to respective tape speeds from which a tape speed can be selected.

A selection switch 50 selects the output of one of these frequency dividers 52a through 52n. The output thus selected is supplied to the phase comparator 49, where it is compared with the signal from the detection head 47. The switch 50 is synchronously intercoupled with the above described switches 30 and 45 and therefore is operated interrelatedly therewith. The moving contacts of these switches 30, 45, and 50 are connected to their contacts R at the time of recording or of normal reproduction. The comparison error output of the phase comparator 49 is supplied to an adder 53, where it is added to the output signal from the above described frequency discriminator 44. The rotation of the motor 20 is controlled by the output signal of the adder 53.

At the time of speed-change reproduction mode of operation, the switches 30, 45, and 50 are switched to their contact points for the selected tape speed. The output of that frequency divider among the frequency dividers 52a through 52n which corresponds to the selected tape speed is supplied to the phase comparator 49. As a consequence, the motor 20 causes the tape 18 to travel at a predetermined speed in accordance with the speed-change reproduction mode, as described hereinafter. For still-picture reproduction, the motor 20 is not rotated, and the travel of the tape 18 is stopped. The video signals reproduced by the video heads 13a and 13b are passed through the recording and reproducing circuit 12 and led out through an output terminal 54.

At the time of reproduction, the moving contact of the switch 26 is switched to the contact point b. The control signal reproduced by the control head 27 is supplied through the switch 26 and the amplifier 28 to the monostable multivibrator 29. The switch 30 is switched, in accordance with the reproducing mode, to one of its contact points P1 through Pn respectively in order to complete a circuit through one of the resistors of different resistance values. The time constant of the monostable multivibrator 29 is selected by switching over of the switch 30 in accordance with the speed-change reproduction mode. By thus selecting a time constant, the fall position or trailing edge of the output pulse indicated in FIG. 2(B) is set.

At the time of reproduction, also, the motor 15 turns the rotary drum 16 at a rotational speed of 30 Hz. The signal obtained by using the signal picked up by the pickup head 35 and the output signal of the monostable multivibrator 29 are phase compared, and, in response to the resulting output signal, the rotational phase of the motor 15 is controlled. This operation is similar to that used at the time of recording.

The gaps of the video heads 13a and 13b respectively have mutually opposite azimuths. Therefore, due to azimuth losses no signal is reproduced if the video heads 13b and 13a respectively scan the tracks recorded by the video heads 13a and 13b (i.e., where a so-called reverse tracking is carried out). At the time of normal reproduction, the rotational phase of the motor 15 is so controlled that the sampling pulses will sample the middle part of the slope of the trapezoidal wave which is formed in correspondence with pulses of positive polarity from the pickup head 35. These pulses of positive polarity are generated in coincidence with the rotational position of, for example, the head 13a. For this reason, in a normal reproduction mode, the rotational phases of the video heads 13a and 13b are controlled so that they always scan (positive tracking) the tracks recorded by these heads 13a and 13b, respectively. The reverse tracking does not occur.

Figure 3:
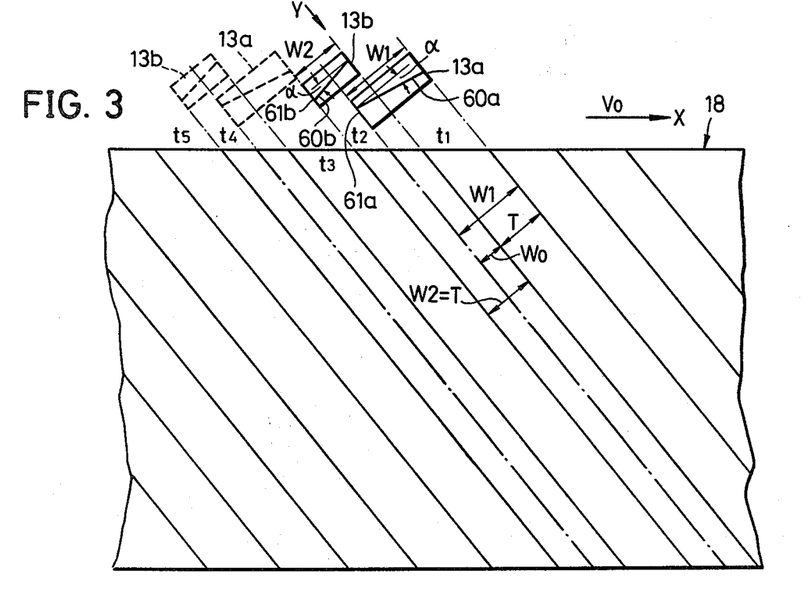
FIG. 3 is a block diagram indicating a track pattern at the time of recording.

The video heads 13a and 13b, as shown in FIG. 3, respectively have gaps 60a and 60b inclined by an angle $\alpha$ mutually in the opposite direction relative to the direction perpendicular to the scanning direction, that is, have azimuths of the angle $\alpha$. These video heads 13a and 13b have respectively different track widths W1 and W2 and are so provided that their respective end faces 61a and 61b are at the same reference face of the rotary drum 16. In the present embodiment of the invention, the width W1 is equal to 1.5W2.

Video signal recorded tracks are formed on the tape 18 by the heads 13a and 13b in the following manner. When the head 13a rotating in the arrow direction Y scans the tape 18 traveling in the arrow direction X, a recorded track of the width W1 is formed obliquely to the longitudinal direction of the tape. Next, when the head 13b scans the tape 18 with an overlap of a width Wo over the track previously formed by the head 13a, a recorded track of the width W2 ($=T$) is formed. Here, the overlap width Wo is so set that $Wo = W_1 - T$.

Then, since the recorded video signal has been frequency modulated, when a head scans and records a new signal with overlap over a track part which has been previously recorded, the previously recorded signal is erased by the bias effect of this new signal, and the new signal is recorded, as in known systems. Consequently, the signal recorded by the head 13a remains as a track t1 of the width T, while the signal recorded by the head 13b remains as a track t2 of the width T. Similarly thereafter, tracks t3, t5, t7, . . . (wherein the subscripts of t are odd numbers) of width T are formed by the recording of the head 13a and the erasing effect of the head, and tracks t4, t6, t8, . . . (wherein the subscripts of t are even numbers) of width T are formed by the recording of the head 13b.

In this connection, it is to be understood that, in order to form the tracks in close contact in this manner, it is not absolutely necessary to use heads of different track widths as described above, it being possible to use heads of the same track width. In the practice of the system of the present invention, however, it is necessary that the track widths be different for the purpose of speed-change reproduction as described hereinafter, and, since recording also can be carried out by means of these reproducing heads, the above description has been set forth.

In this case, the tracks t1, t2, t3, . . . are in contiguous contact without gaps therebetween, whereby the tape utilization efficiency is high. Each track is recorded with a part of a video signal corresponding to substantially one field, and a vertical synchronizing signal is positioned near an end of the track. Although not shown, an audio signal and a control signal are recorded respectively at the upper and lower lateral edges of the tape 18 along tracks in the longitudinal direction of the tape.

In the system of the present invention, at the time of speed-change reproduction when reproduction is carried out at a tape speed (inclusive of zero, also) differing from the tape speed at the time of normal reproduction, the tape speed is so selected as to satisfy the following equation.

$$V = Vo\left(\frac{n-1}{n}\right)$$

where: V is the tape speed for speed-change reproduction mode;

Vo is the tape speed for normal reproduction mode (and recording): and n is a positive or negative integer.

The rotating speed of the heads 13a and 13b is always constant, i.e., 30 rps. in all reproduction modes. By thus selecting the tape speed so as to satisfy this equation, the minimum position of the reproduced signal level drops due to reproduction with the heads 13a and 13b deviation from their tracks (the distance from the tape edge, that is, the position on the reproduced picture screen) becomes always constant, as described hereinafter.

In the case where the tape speed does not satisfy the above equation, the position of the noise bar arising in accompaniment with the minimal reproduced signal level is not constant in the reproduced picture. Consequently, the quality of the entire reproduced picture is impaired by the noise, whereby a practically useful reproduced picture cannot be obtained.

Next, an example of fast (quick) motion reproduction wherein n is made equal to −1, that is, V=2Vo, or double-speed reproduction, will be described in conjunction with FIGS. 4A and 4B.

For this double-speed fast-motion reproduction, the moving contact of the switch 50 is connected to its contact point P1. A signal of a frequency corresponding to double speed which has been frequency divided by the frequency divider 52b is thereby supplied to the phase comparator 49. As a consequence, the motor 20 is so controlled that is rotates at a speed which is twice that for normal reproduction of the tape 18. The capstan 20 is rotated at twice the normal speed, and the tape 18 is driven at a traveling speed which is twice the traveling speed Vo for normal recording or reproducing. The switch 30 is changed over to the contact point P1, and the time constant of the monostable multivibrator 29 is changed over and set at a value set beforehand in correspondence to this double-speed fast-motion reproduction. As a result, the fall time instant of the output pulse signal b indicated in FIG. 2(B) of the monostable multivibrator 29 is extended to an instant which is slightly offset from the instant corresponding to the negative polarity pulses among the pulses c obtained from a pickup head as indicated in FIG. 2(C) in response to this time constant.

The control system of the motor 15 described in conjunction with FIG. 1 controls the rotational phase of the motor 15 in a manner such that the pickup head 35 picks up a signal so that the central part of the trapezoidal wave g as indicated in FIG. 2(G) will be sampled by the sampling pulses obtained from the pulses indicated in FIG. 2(B). Thus, at the time of this double-speed, fast-motion reproduction, rotational control is carried out intentionally so that the heads 13a and 13b will carry out reverse tracking and start their tracings from positions deviated by a distance D as shown in FIG. 4A.

Figure 4A:
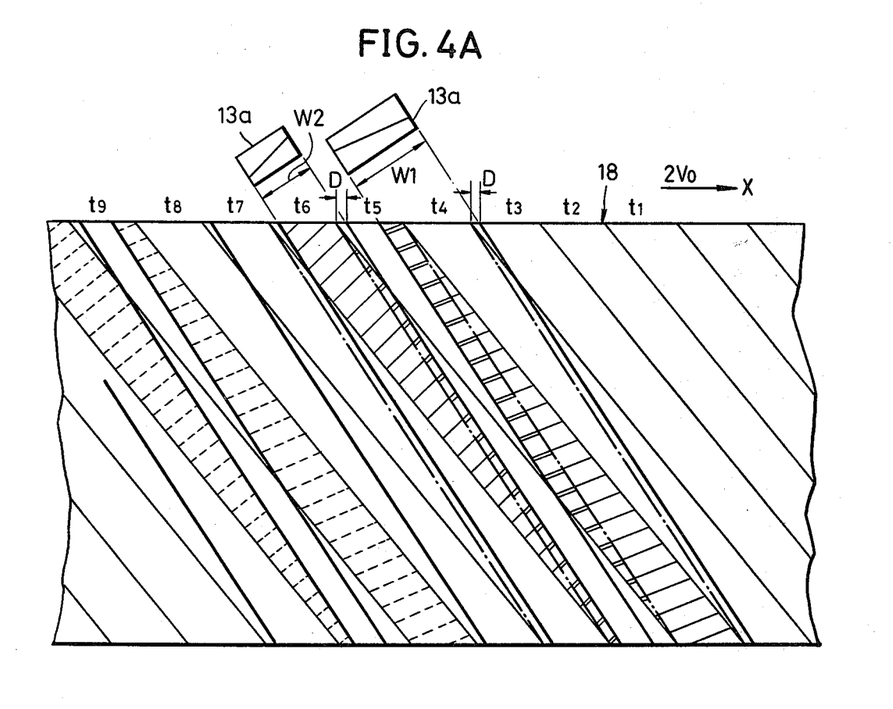
FIGS. 4A and 4B are respectively a diagram indicating the scanning track pattern at the time of double-speed fast (quick) motion reproduction and a graph indicating the variation with time of the level of the reproduced signal.

For this reason, as indicated in FIG. 4A, the head starts to scan from the reverse tracking position of the track t4. However, since the scanning starting position end is offset by the distance D as described above, and, moreover, the head 13a has a track width W1 greater than the width T of the tracks on the tape, the head 13a starts to scan as it straddles or spans over also parts of the tracks t3 and t5. Since the tape 18 is traveling at the speed 2Vo, the head 13a which has started scanning from the above mentioned position scans as indicated by bold full line and ends its scanning at a position where it straddles the tracks t4, t5, and t6.

The head 13b starts scanning from the track t6, but, since the scanning starting position end is similarly offset by the distance D, it starts scanning from a position where it straddles slightly also a part of the track t5. The head 13b scans as indicated by bold full line and terminates its scanning at a position where it straddles the tracks t6 and t7. Thereafter, the heads 13a and 13b carry out scanning similarly with respect to the other tracks.

Here, since the heads 13a and 13b have azimuths as described above, when they respectively scan the tracks recorded by the head 13b and 13a namely performs reverse tracking, no signal is reproduced because of azimuth loss. For this reason, in the case of the above mentioned example of scanning path, the head 13a reproduces a portion of the tracks t3 and t5 as indicated by single and double line hatchings. Similarly, the head 13b reproduces a portion of the track t6 as indicated by the single and double line hatchings. For this reason, the level of the signal reproduced by the heads 13a and 13b varies as indicated by full line in FIG. 4B.

Figure 4B:
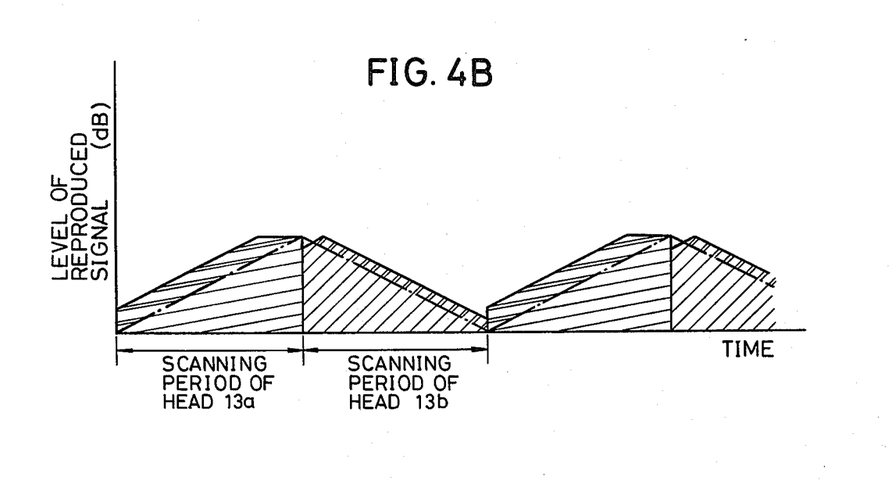

As is apparent from FIG. 4B, the time at which the reproduced signal level becomes a minimum is the time at which the reproducing head 13b completes its scanning or the time at which the reproducing head 13a starts scanning, that is, the time of scanning of the track end part where the vertical synchronizing signal has been recorded.

The head 13a, at the start of its scanning, scans and reproduces simultaneously the track t3 together with the track t5, and beats are produced during this part of the scanning. However, the quantity of reproduction of the track t3 is very small and, moreover, is within the vertical blanking period. For this reason, noise due to beat disturbance does not appear in the reproduced picture, and there is no deleterious effect in actual practice.

As conductive to a full understanding of the unique features of the system of the present invention, the case wherein, as an assumption, the heads 13a and 13b have a track width W2 which is the same as the width T of the tracks on the tape and respectively start scanning from tracks t4 and t6 will be considered. In this case, the two heads respectively carry out scanning as indicated by the single-dot chain lines in FIG. 4A. Consequently, the two heads scan and reproduce the parts indicated by plain single-line hatching of tracks t5 and t6, and the level of the reproduced signal varies as indicated by single-dot chain line in FIG. 4B. In this case, the reproduced signal level decreases to substantially zero at the time of starting and at the time of ending of scanning of the two heads. For this reason, there is the possibility of the vertical synchronizing signal not being positively reproduced, whereby vertical synchronization of the reproduced picture cannot be attained, and the picture becomes chaotic in some cases.

In accordance with the system of the present invention, however, since the head 13a has a width W1 which is greater than the width T of the tracks on the tape, it scans and reproduces the parts indicated by double-line hatching in FIG. 4A in excess of the area covered in the case of a head of a track width equal to the a width T. For this reason, the reproduced signal level increases by an extent as indicated by double-line hatching relative to the level indicated by single-dot chain line in FIG. 4B. As a final result, the reproduced signal level becomes as indicated by full line. On one hand, the head 13b scans along a path offset or deviated in a longitudinal direction of the tape by a distance D from the path indicated by the single-dot chain in FIG. 4A as mentioned above. For this reason, the scanned portion (with respect to the track t6) is slightly smaller than the portion scanned in the path indicated by the single-dot chain line, in the very short period at the start of scanning. As a total result, this head 13b scans and reproduces the excess portion indicated by double-line hatching in FIG. 4A. As a consequence, the reproduced signal level increases by an extent indicated by the double-line hatching relative to the level indicated by single-dot chain line in FIG. 4B. As a result, the reproduced signal level becomes as indicated by full line.

Consequently, even when the reproduced signal level is a minimum at the instant of scanning completion of the head 13b and at the instant of the start of scanning of the head 13a, the reproduced signal level does not become zero but is above a specific value. For this reason, the vertical synchronizing signal recorded at the track end part is positively reproduced. A reproduced picture is obtained wherein the vertical synchronization is positively attained. Furthermore, in the vicinity of the minimum points of the reproduced signal level, also, since the reproduced signal level as a whole is high, the magnitude of the noise generated as a consequence of the low level of the reproduced signal (low S/N ratio) is also small.

For this reason, the noise bar produced by the minimum level of the reproduced signal is small, and, moreover, even when this noise bar is caused to be the vertical blanking, there is no disturbance of the vertical synchronization. Therefore, a good speed-change reproduced picture in which no noise whatsoever appears can be obtained. Furthermore, since the reproduced signal level is high as a whole, a reproduced picture of good S/N ratio is obtained.

In this case, since reproduction of two fields with respect to four fields is carried out, the reproduction time is shortened to one half, and the reproduced picture becomes a double-speed fast-motion reproduced picture which moves at twice the speed in normal reproduction.

In this double-speed fast-motion reproduction, after the reproduction of two fields (i.e., one frame), one frame is skipped, and reproduction of the next one frame is carried out. For this reason, there is an advantage since the lowering of the vertical resolution is reduced as compared to the resolution when every field is reproduced.

Next, an example of reproduction under the condition of $n = -2$ in the equation set forth hereinbefore, whereby $V = (3/2)Vo$, that is, 3/2-speed fast-motion reproduction, will be described in conjunction with FIGS. 5A and 5B.

For 3/2-speed fast-motion reproduction, the moving contacts of the switches 30, 45, and 50 are connected to their respective contact points P2. As a result of the switching of the switch 50 to its contact point P2, a signal frequency divided by the frequency divider 52c is supplied to the phase comparator 49, whereby the tape 18 is driven at a speed of $(3/2)Vo$, which is 1.5 times the speed for normal reproduction. As a consequence of the switching of the switch 30, the monostable multivibrator 29 is set at a time constant for 3/2-speed fast-motion reproduction so that the heads will scan along the track positions described hereinafter.

Figure 5A:
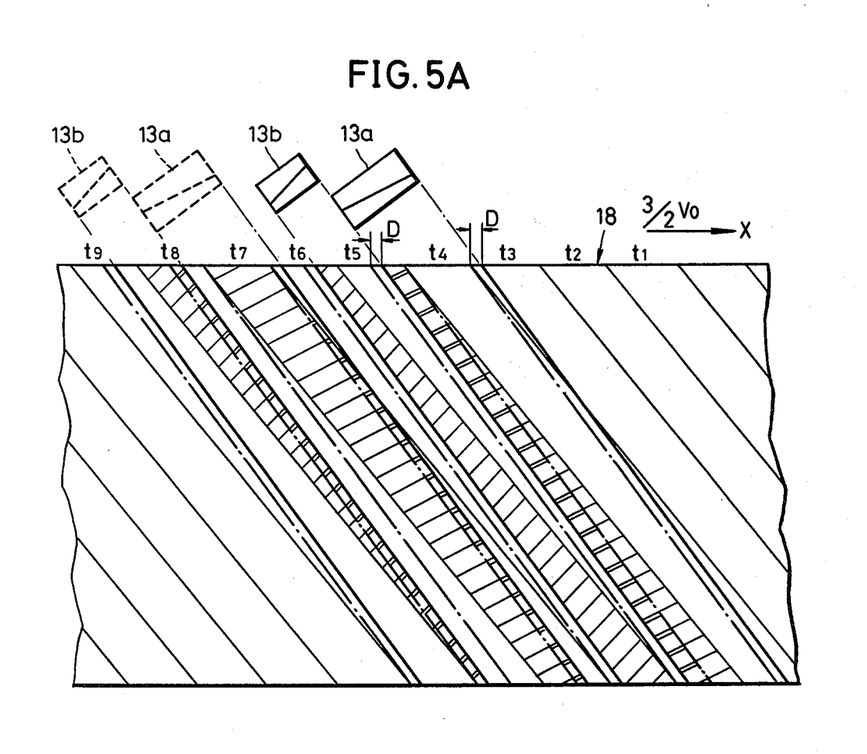
FIGS. 5A and 5B are respectively similar to FIGS. 4A and 4B for 3/2-speed, fast motion reproduction.

Referring to FIG. 5A, when the head 13a starts scanning from the position where it straddles tracks t3, t4, and t5, for example, it scans as indicated by full line and ends its scanning at a position where it straddles the tracks t4 and t5. The head 13b starts scanning from a position where it straddles the tracks t5 and t6 and scans as indicated by full line. Next, the head 13a starts scanning from a position where it straddles the tracks t6, t7, and t8 and scans as indicated by full line, and the head 13b starts scanning from a position where it straddles the tracks t8 and t9 and traces as indicated by full line. Thereafter, scanning is carried out similarly also for the other tracks.

Figure 5B:
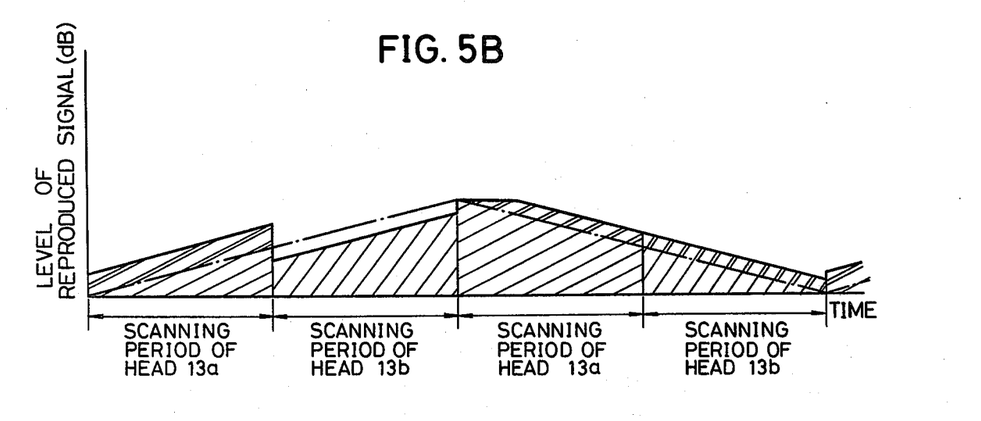

Here, if it is assumed that the heads 13a and 13b have a width W2 equal to the track width T and, moreover, start to scan from positions without the offset or deviated distance D, each head will scan along a path indicated by single-dot chain line, and the reproduced signal level will become as indicated by single-dot chain lne in FIG. 5B.

However, in the system of the present invention, since the head 13a has a track width W1 and, moreover, starts scanning from a position deviated by the distance D, it scans more of the portion indicated by double-line hatching than the path indicated by single-dot chain line of the track t5, and the reproduced signal level of the parts indicated by double-line hatching in FIG. 5B is higher. As for the head 13b, the area over which it scans the track t6 according to the above mentioned deviated distance D decreases, and the reproduced signal level also becomes somewhat lower than the level indicated by single-dot chain line. However, in the scanning and reproduction of the heads 13a and 13b thereafter, the scanning parts indicated by double-line hatching in FIG. 5A increase, and the reproduced signal level also becomes high as indicated at the parts of the double-line hatching.

Consequently, the reproduced signal level becomes somewhat lower than the single-dot chain line at a rate of one in a total of four scannings of the heads, that is, one field in four fields, but in the remaining three fields, the reproduced signal level is increased. For this reason, the reproduced signal level as a whole is high, and a reproduced picture of good S/N ratio is obtained. The minimum point of the reproduced signal level occurs every four fields. Since of reproduced signal of a certain level exists even at these minimum reproduced signal level points, advantages similar to those described above in the case of double-speed fast-motion reproduction are afforded.

An example of reproduction under the condition of $n=2$ in the equation given hereinbefore, whereby $V=(\frac{1}{2})V_o$, that is, $\frac{1}{2}$-speed slow-motion reproduction, will now be described with reference to FIGS. 6A and 6B.

In this operation, the moving contacts of the switches 30, 45, and 50 are connected to the contact points P3. The tape is driven to travel at a speed of $(\frac{1}{2})V_o$, which is one half of the speed for normal reproduction. The time constant of the monostable multivibrator 29 is switched in response to a reproduction control signal reproduced with a period which is twice the normal period.

Figure 6A:
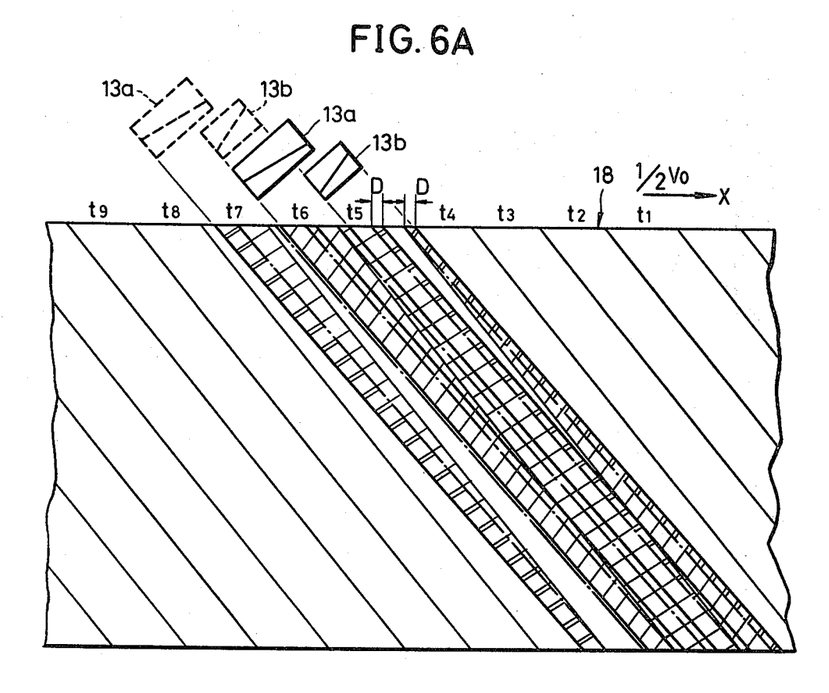
FIGS. 6A and 6B are respectively similar to FIGS. 4A and 4B for half-speed slow motion reproduction.

Referring to FIG. 6A, the head 13b starts to scan from a position where it is straddling the tracks t4 and t5, for example, and scans as indicated by bold full line. The head 13a starts to scan from a position at which it straddles the tracks t5 and t6 and scans as indicated by bold full line. Next, the head 13b starts to scan from the position where it straddles the tracks t5 and t6 and scans as indicated by bold full line, and the head 13a starts to scan from a position at which it straddles the tracks t6 and t7 and scans as indicated by bold full line. Thereafter, the same scanning operation is carried out also for the other tracks.

Figure 6B:
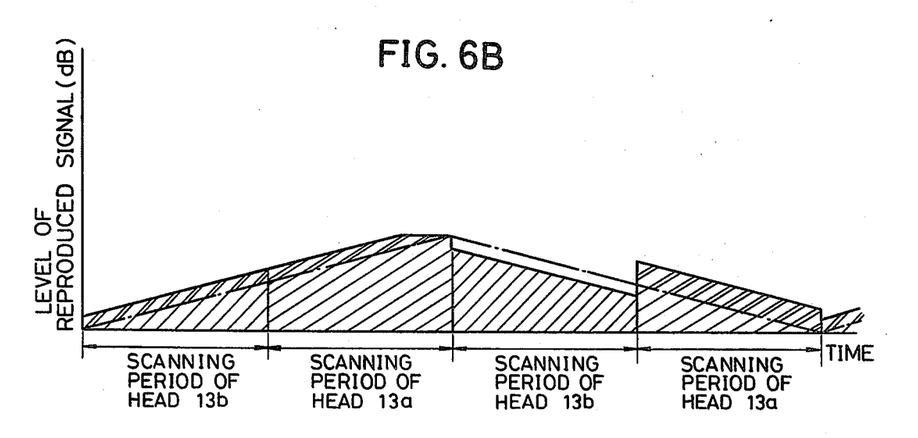

Here, in the case where the heads 13a and 13b have the same width as the width T of the tracks, and there is no offset distance D, the respective scanning paths become as indicated by single-dot chain line, and the reproduced signal level becomes as indicated by single-dot chain line in FIG. 6B.

However, the head 13a has a large track width W1, and, moreover, the scanning positions of the heads 13a and 13b are offset or deviated by the distance D as described above. For this reason, the portions indicated by double-line hatching are also scanned and reproduced in addition to the portions indicated by plain single-line hatching. Consequently, the output level of the reproduced signal also becomes as indicated by full line in FIG. 6B. This result and features of scanning will be readily scan from the description given hereinbefore.

An example of still-picture reproduction wherein $n=1$ in the equation set forth hereinbefore, whereby $V=0$, that is, the tape travel is stopped, will now be described with reference to FIGS. 7A and 7B.

Figure 7A:
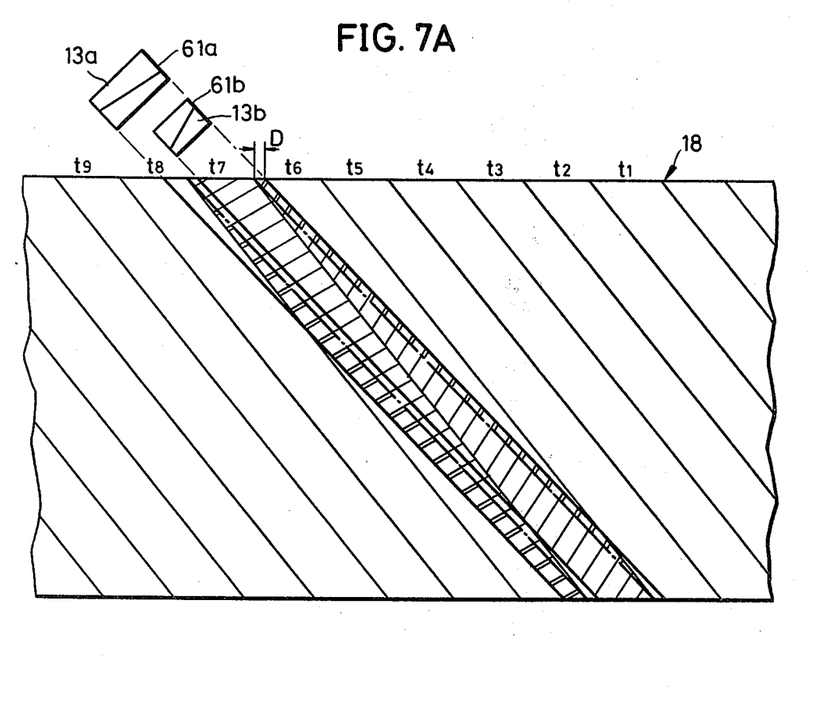
FIGS. 7A and 7B are respectively similar to FIGS. 4A and 4B for still picture reproduction.
Figure 7B:
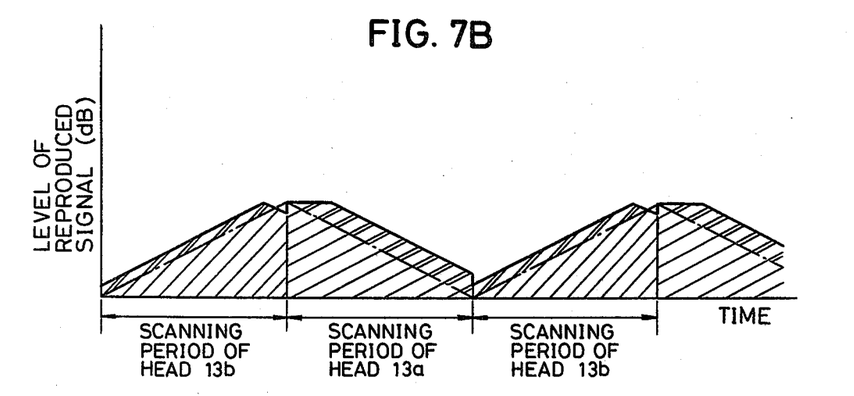

Referring to FIG. 7A, when the head 13b starts to scan from a position at which it is straddling the tracks t6 and t7, it scans along the path indicated by full line and terminates its scanning at a position where it straddles the tracks t5 and t6. Since the tape 18 is stopped, the head 13a also, with its end face 61a tracing the same path as that of the end face 61b of the head 13b, starts to trace from a position where it straddles the tracks t6, t7, and t8 and ends its scanning at a position where it straddles the tracks t5, t6, and t7. Thereafter, the above described scanning operation is repeated. The heads 13b and 13a have a normal tracking relationship to the tracks t6 and t7, respectively.

In this case, since the heads 13a and 13b have the above mentioned track widths and, moreover, start scanning from positions which are deviated by the distance D, they scan and reproduce also the portions indicated by double-line hatching in addition to the portions indicated by plain single-line hatching in FIG. 7A. Accordingly, the reproduced signal level also becomes as indicated by full line in FIG. 7B, and the same desirable features as obtained in the preceding examples of speed-change reproduction modes are afforded.

In this case, since the tape travel is stopped, no control signal is reproduced. For this reason, the rotational phases of the heads 13a and 13b are not controlled as in the case of the above described reproduction modes, the exact track end position on the tape from which scanning will start cannot be readily determined. In the case where the minimum point of the reproduced signal level does not correspond to end parts of the tracks, a noise bar appears at a conspicuous position in the reproduced picture. In this case, by manually shifting the tape through a very small distance thereby to cause each head to start its scanning from the positions of the tracks as described above the noise bar is caused to be hidden within the vertical blanking periods.

Figure 9A:
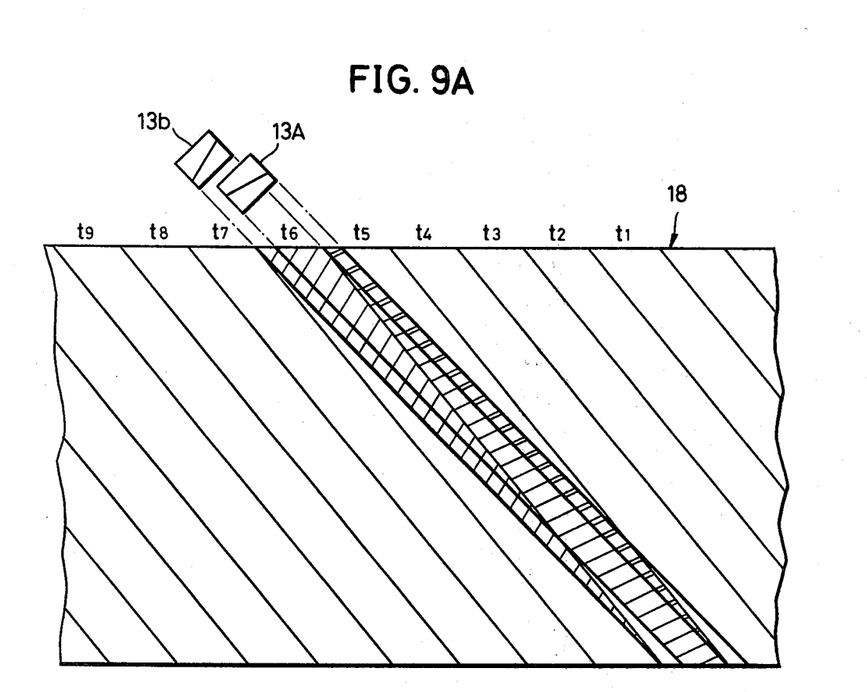
FIGS. 9A and 9B are respectively similar to FIGS. 4A and 4B for another example of half-speed slow motion reproduction.

The reproduced horizontal synchronizing signal lacks in a minimum level point of the reproduced signal. Accordingly, it is also possible by utilizing this phenomenon to cause the noise bar to be automatically within the vertical blanking period. In this case, by a known sampling technique, the presence or absence of a reproduced horizontal synchronizing signal or whether or not the level is below a specific level is detected by a method such as sampling the reproduced horizontal synchronizing signal and the output signal of a sawtooth wave oscillator or slicing the outputs obtained by gating the two signals at a specific level. The resulting detection signal may be used to trigger a monostable multivibrator, the resulting output of which is used to rotate the capstan motor 20 intermittently during very small periods to cause the tape 18 to shift intermittently through minute distances, whereby each head starts its scanning just at the starting end of a track as indicated in FIG. 9.

In the above described embodiment of the invention, the track width of the head 13a is made greater than the width of the track on the tape, and, moreover, the heads 13a and 13b start to scan from positions that are deviated by the distance D in the track longitudinal direction from the track edge. However, even if the track widths of the two heads are the same, the heads may be positioned at staggered height positions which are separated by a gap d with respect to the rotating reference surface. In this manner an effect close to that in the above described case can be obtained. One example of such an arrangement is set forth below.

Figure 8A:
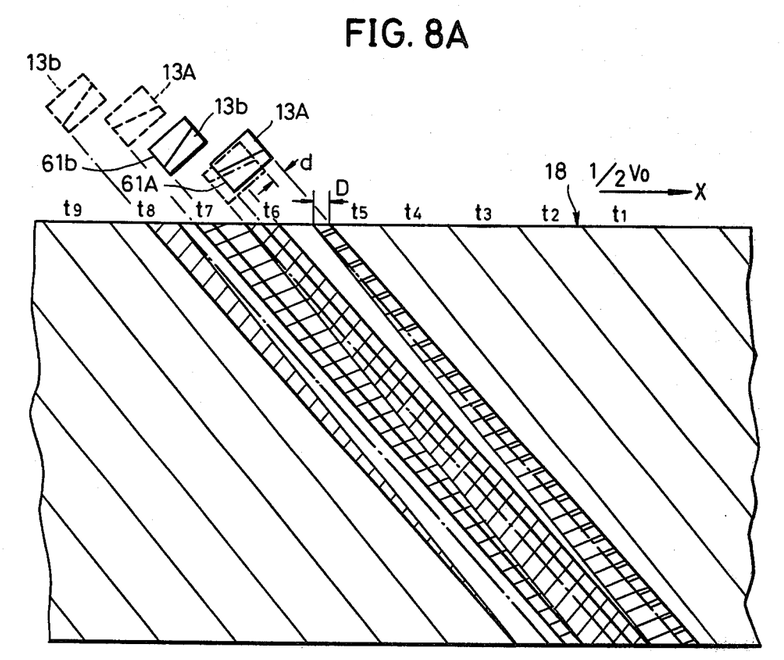
FIGS. 8A and 8B are respectively similar to FIGS. 4A and 4B for another example of double-speed fast motion reproduction.
Figure 8B:
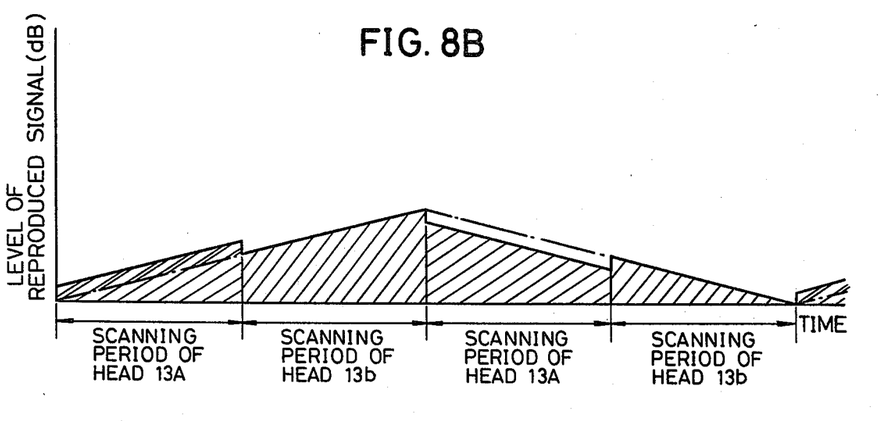

FIGS. 8A and 8B illustrate an example of $\frac{1}{2}$-speed slow motion reproduction. The head 13A used in the present embodiment of the invention is identical to the head 13B and has a track width W2 equal to the width T of the tracks on the tape 18. Moreover, this head 13A is diametrically disposed in a relatively opposed relation to the head 13b on the rotary drum 16. Further, the end face 61A of this head 13A is disposed at a position staggered in height by a gap d from the end face 61b of the head 13b with respect to the rotational surface of the rotary drum 16.

In this case, in order to adapt the head 13A so that it can be used as a recording head or a reproducing head at the time of normal reproduction, the head 13A is disposed at a height such that its end face 61A is positioned on the same rotational surface as the end face 61b of the head 13b. The head 13A is mounted, for example, on the extremity of a known head support comprising a piezo-electric element. At the time of speed-change reproduction, a specific voltage is impressed on this piezo-electric element, which thereupon undergoes a deformation and thereby causes the head 13A to be displaced through the distance d from the position indicated by single-dot chain line to the position indicated by full line in FIG. 8A.

With respect to the case where the head 13A is not displaced by the displacement of the above mentioned distance d, the head 13A scans from a position deviated by the distance D on the tape 18. For this reason, the head 13A starts to scan from a position where it straddles the tracks t5 and t6, for example, and scans along the path indicated by full line. The head 13b starts scanning from a position where it straddles a half of each of the tracks t6 and t7 and ends its scanning at the track t6. Next, the head 13A starts to scan from a position where it straddles the tracks t6 and t7 and scans along the path indicated by full line. The head 13b starts to scan from a position at which it straddles the tracks t7 and t8 and ends its scanning at the track t7.

Thus, the heads 13A and 13B scan the portion indicated by plain single-line hatching and by double-line hatching in FIG. 8A, and the reproduced signal level becomes as indicated in FIG. 8B. Although, as a result of the head 13A being displaced by the distance d as described above, the reproduced signal level of the track t7 decreases, the reproduced signal level of the track t5 increases. Accordingly, while in the part of minimum reproduced signal level which appears every four fields, the reproduced signal level of the head 13b decreases to substantially zero. The reproduced signal level of the head 13A is above a certain value even when it is at a minimum level. For this reason, even though the vertical synchronizing signal is not reproduced by the head 13b, it is positively reproduced by the head 13A.

One measure which may be resorted to for preventing the above mentioned lowering of the reproduced signal level due to the displacement of the head 13A comprises applying a voltage to the above mentioned piezo-electric element during one field period in every four fields thereby to cause a displacement of the head 13A and thereby to cause a level increasing in the above mentioned part of minimum reproduced signal level and causing the head 13A to be at the same height position as the head 13b in the other field periods.

Figure 9B:
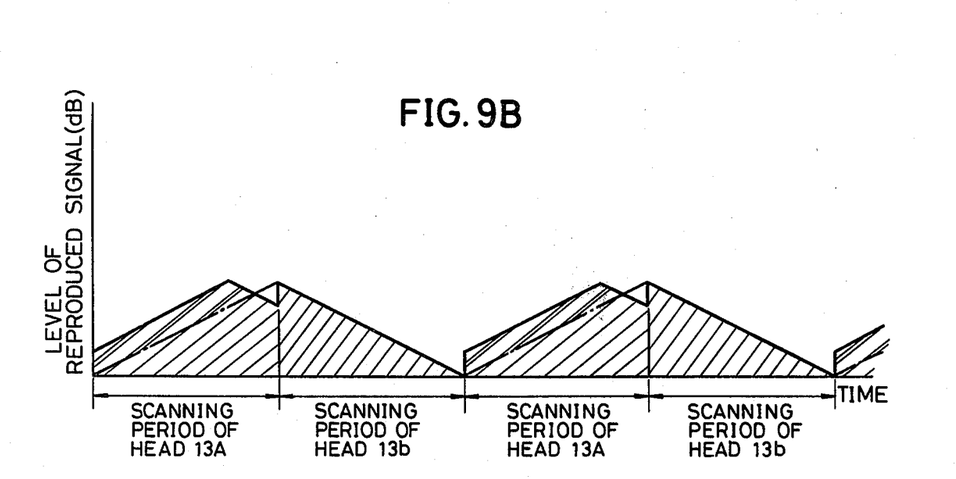

The still-picture reproduction by the above described head arrangement is indicated in FIGS. 9A and 9B. The head 13A starts scanning as it straddles the tracks t5 and t6, for example, and the head 13b starts scanning from the track t6. For this reason, the head 13A scans the portion indicated by double-line hatching in excess of the area scanned in the case where it scans along the same path as the head 13b. Accordingly, similar to the above described example, the level of the signal reproduced by the head 13A does not become zero even at its minimum point, being above a certain value.

Figure 10A:
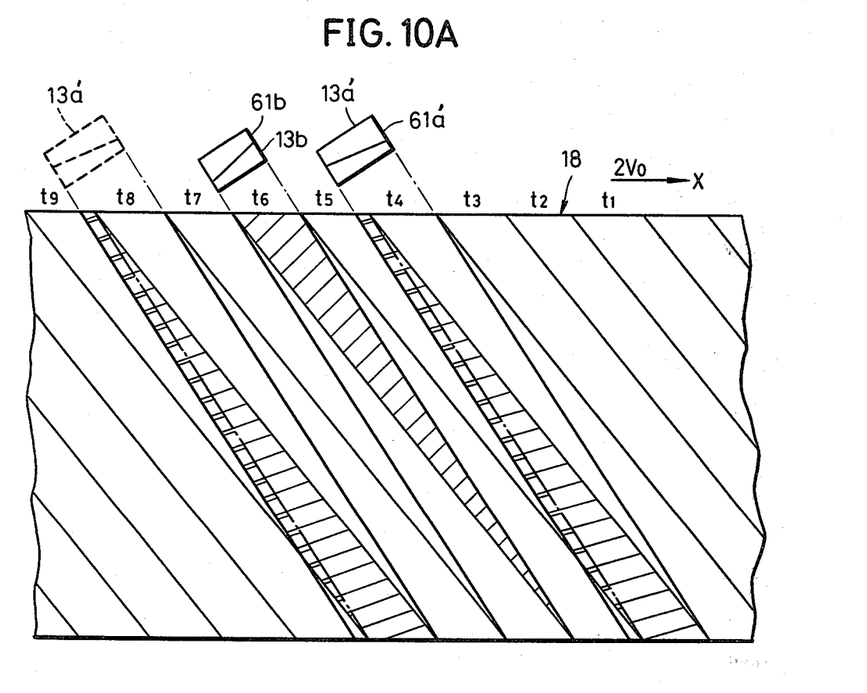
FIGS. 10A and 10B are respectively similar to FIGS. 4A and 4B for another example of still picture reproduction.
Figure 10B:
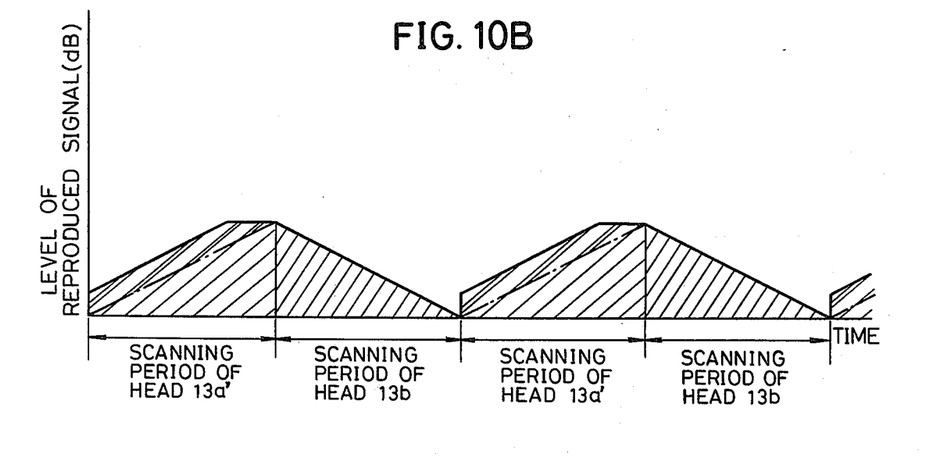

Furthermore, instead of causing the head 13A to be displaced, its track width may be increased by the abovementioned displacement distance d, one example of which is indicated in FIGS. 10A and 10B. This is an example of double-speed fast-motion reproduction wherein the tape speed is 2Vo. The head 13a' has a track width W1' (>T), while the head 13b has a track width W2 (=T). The end faces 61a' and 61b of the head 13a' and 13b are disposed on the same rotating reference surface. The head 13a' scans and reproduces a portion indicated by double-line hatching in FIG. 10A in excess of the area it would scan in the case where it has the same track width as the head 13b. Consequently, the reproduced signal level also increases by a quantity indicated by the double-line hatching in FIG. 10B.

In the above described embodiments of the invention, the track widths of two video heads are made different, or the height position of one of the heads is displaced, but other measures may be resorted to as long as the height positions of the centers of the track widths of these heads are mutually offset or staggered with respect to the rotational surface.

While, in each of the above described embodiments of the invention, the rotational phases of the rotating heads 13a and 13b are so controlled as to cause the noise bar due to the minimum reproduced level to be substantially within the vertical blanking periods, the rotation of the motor 20 may be controlled thereby to control the traveling phase of the tape 18.

In this connection, the general equation for the tape speed for speed-change reproduction selected by the system of the present invention is $$V = Vo\left(\frac{n-1}{n}\right)$$

as mentioned hereinbefore. It will be observed that, as the integer n increases in value, the tape speed V approaches the value of the speed Vo. For this reason, in an actual apparatus to which the system of the present invention has been applied, it is not necessary to carry out speed-change reproduction with respect to all values of this integer n. If the kinds of speed-change reproduction mode are of the order in the above described embodiment of the invention, the requirements of speed-change reproduction mode can be satisfied almost completely for practical purposes. For this reason, the numbers of the resistors and frequency dividers which can be selectively switched by the switches 30, 45, and 50 need not be very large for practical purposes.

In the embodiment described with reference to FIG. 1, the signal crystal oscillator 51 and the frequency dividers 52a through 52n are employed to obtain different predetermined frequencies corresponding to the tape speed. This invention is not limited to this embodiment. For example, a plurality of oscillators, which respectively oscillate different predetermined frequencies, may be provided. In this case, the oscillated outputs may be selected by the switch 50.

The video signals reproduceable by the system of the present invention are not limited to color video signals byt may be monochrome video signals. The only requirement is that these signals have been recorded by heads having different azimuth angles on mutually neighboring tracks.

Further, this invention is not limited to these embodiments. Variations and modifications may be made without departing from the scope of the invention.

What is claimed is:

1. A video signal, speed-change reproducing system for reproducing video signals which are recorded by a pair of rotary recording heads mounted on diametrically opposite sides of a rotating member, said heads being activated alternately to reproduce said video signals from recorded video tracks disposed contiguously and obliquely relative to the tape longitudinal direction, said recording heads having gaps of mutually different azimuth angles, said tape further having a control signal track recorded along a transverse edge, said control signals corresponding to the rotation of the recording heads, the reproducing system comprising:

driving means for transporting said tape;

a first control means for controlling said driving means to cause said tape to travel at a selected speed V represented by the equation $$V = V_0 \left( \frac{n-1}{n} \right),$$

wherein $V_0$ is the tape speed for normal reproduction (and recording), and n is a positive or negative integer, and to cause the tape to stop;

means comprising a rotational member having a pair of reproducing heads mounted on diametrically opposite sides thereof, said reproducing heads having gaps of mutually different azimuth angles which are the same as said azimuth angles of the recording heads, said reproducing heads successively scanning said video tracks on the tape to reproduce said recorded video signal, the centers of track widths of the reproducing heads being in different height positions in said rotational planes;

a fixed head for picking up the control signal from said edge track; and a second control means for controlling the relative phases of the rotating member and the tape travel so that said rotational phase of the rotating member is maintained in a predetermined phase relationship with respect to the picked up control signal, said predetermined phase with respect to the picked up control signal being such that each time instant when the level of the reproduced signal becomes a minimum value is within or in the vicinity of a vertical blanking period, and the minimum level of the reproduced signal does not become zero.

2. A video signal, speed-change reproducing system as claimed in claim 1 in which the gaps of the reproducing heads have mutually different track widths, and one side of the end faces of said gaps in the track width direction of the reproducing heads being disposed at the same height position.

3. A video signal, speed-change reproducing system as claimed in claim 2 in which one of said reproducing heads has a track width which is greater than the width of a track on said tape, and the other of the reproducing heads has a track width which is equal to the width of a track on the tape.

4. A video signal, speed-change reproducing system as claimed in claim 1 in which said second control means controls relative scanning phases of the reproducing heads to start or complete the scanning of each track with one side of the end faces of the gaps at positions which deviate by a specific distance D in the tape longitudinal direction at an instant when the reproduced signal level becomes a minimum value, said deviation being from an edge of the end of the track.

5. A video signal, speed-change reproducing system as claimed in claim 1 in which the reproducing means further comprises means effective at the time of speed-change reproduction for causing one of the reproducing heads to have a height position on the rotational surface of an end face in the track width direction, which height position is different from the height position of an end face in the track width direction of the other reproducing head.

* * * * *